F. M. STURGES.
FASTENER.
APPLICATION FILED JAN. 29, 1913.

1,069,495.

Patented Aug. 5, 1913.

WITNESSES
G. Robert Thomas

INVENTOR
Frank M. Sturges
BY
ATTORNEYS

UNITED STATES PATENT OFFICE.

FRANK M. STURGES, OF DANBURY, CONNECTICUT.

FASTENER.

1,069,495.

Specification of Letters Patent. Patented Aug. 5, 1913.

Application filed January 29, 1913. Serial No. 744,859.

*To all whom it may concern:*

Be it known that I, FRANK M. STURGES, a citizen of the United States, and a resident of Danbury, in the county of Fairfield and State of Connecticut, have invented a new and Improved Fastener, of which the following is a full, clear, and exact description.

The object of the invention is to provide a new and improved fastener for use on tire chains, logging chains, hame fasteners and similar devices, and arranged to take up all slack in a flexible connection, to securely fasten the parts together and to relieve the pivot of the connecting link of undue strain.

For the purpose mentioned use is made of a hook member adapted to be closed by the free end of a lever having its heel provided with a slot engaged by a pivot held on the outer end of the shank of the hook member, the lever being provided with an apertured boss in which is journaled the pivot of a connecting link, the said boss being adapted to be seated on a seat formed on the hook member between the ends thereof.

A practical embodiment of the invention is represented in the accompanying drawings forming a part of this specification, in which similar characters of reference indicate corresponding parts in all the views.

Figure 1:
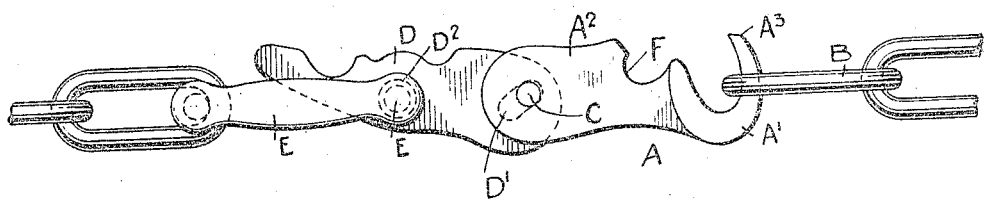
Figure 2:
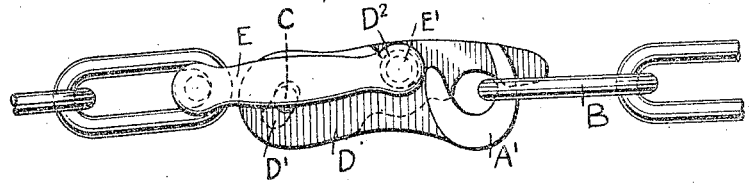
Figure 3:
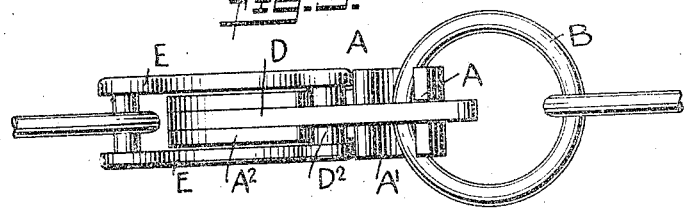
Figure 4:
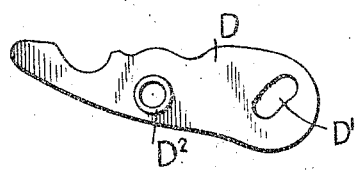
Figure 5:
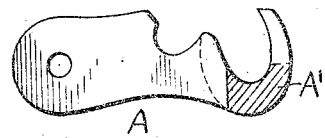

Figure 1 is a side elevation of the fastener with the parts in open position; Fig. 2 is a like view of the same with the parts in closed position; Fig. 3 is a plan view of the same; Fig. 4 is a side elevation of the operating lever; and Fig. 5 is a similar view of the hook member.

The hook member A of the fastener is provided with an open hook A' adapted to be engaged by an end link B of the flexible connection on which the fastener is used. The shank A² of the hook member A is bifurcated, and is provided at its outer end with a transversely-extending pivot C passing through a slot D' formed in the heel of the operating lever D connected with an end link E of the flexible connection on which the fastener is used. The lever D is adapted to pass with its free end between the members of the bifurcated point A³ of the hook A' so as to close the said hook A' with a view to retain the link B. The lever D is provided intermediate its ends with a boss D² through which extends the forward cross bar or pivot E' of the link E, and the said boss D² extends on opposite faces of the lever D and is adapted to be seated in a seat F formed on the shank A² adjacent the hook A', as plainly indicated in the drawings. The boss D² of the slot D' and the seat F are arranged relatively to each other in such a manner that when the lever D is swung into closed position the boss D² comes in contact with the forward portion of the seat F, and on exerting a strain on the flexible connection the boss travels down the forward portion of the seat F and in a rearward direction until the boss is finally firmly seated in the seat F, and consequently the boss then takes up the strain of the link E in the said boss.

It is understood that the lever D extends between the members of the bifurcated shank A² of the hook member A and consequently both ends of the boss D² engage the seat F so that the strain is equally distributed and the free action of the link E is had. It is also understood that the slot D' is positioned, as shown in Figs. 1, 2 and 4, to allow the rearward sliding movement of the lever D when moving the lever D into closed position, as shown in Fig. 2, with a view to retain the link E in the hook A'. The free end of the lever D projects slightly beyond the point of the hook A' so as to permit the user to conveniently take hold of the free end of the lever whenever it is desired to swing the lever into open position for releasing the link E in the hook A'.

The fastener shown and described is very simple in construction, and composed of comparatively few parts not liable to get out of order easily.

Having thus described my invention, I claim as new and desire to secure by Letters Patent:

A fastener of the class described, comprising a hook member having a bifurcated shank and a bifurcated hook point, the hook member being provided between its ends with a seat, a transverse pivot held on the outer end of the shank, a lever having its heel provided with a slot through which extends the said pivot, the lever extending between the members of the said bifurcated shank, the free end of the lever being adapted to pass between the members of the said bifurcated hook point to close the hook, an apertured boss integrally on the said lever intermediate its ends and adapted to be seated on the said seat, and a link having a pivot extending through the said apertured boss, the side arms of the link being outside the side faces of the said hook member.

In testimony whereof I have signed my name to this specification in the presence of two subscribing witnesses.

FRANK M. STURGES.

Witnesses:
 ROBERT S. ALEXANDER,
 RENA B. ENGELAGE.